US008492513B2

(12) United States Patent
Lee et al.

(10) Patent No.: US 8,492,513 B2
(45) Date of Patent: Jul. 23, 2013

(54) METHOD FOR ENHANCING WATER CONTENT OF SILICONE HYDROGEL CONTACT LENS

(75) Inventors: Chih-Ta Lee, Taipei (TW); Ching-Ping Huang, Taipei (TW); Yi-Hsuan Chang, Taipei (TW); Ken-Yuan Chang, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 0 days.

(21) Appl. No.: 13/273,407

(22) Filed: Oct. 14, 2011

(65) Prior Publication Data
US 2012/0214899 A1  Aug. 23, 2012

(30) Foreign Application Priority Data

Feb. 21, 2011  (TW) .............................. 100105689 A

(51) Int. Cl.
*C08J 7/12* (2006.01)
(52) U.S. Cl.
USPC ........ 528/488; 526/279; 526/317.1; 526/318; 526/318.2; 526/318.3; 526/318.4; 526/318.44; 528/499

(58) Field of Classification Search
None
See application file for complete search history.

(56) References Cited

U.S. PATENT DOCUMENTS 3,808,178 A * 4/1974 Gaylord ........................ 526/279
3,988,274 A * 10/1976 Masuhara et al. ............ 523/106

FOREIGN PATENT DOCUMENTS
CN           101289541 A      10/2008

\* cited by examiner

*Primary Examiner* — Marc Zimmer
(74) *Attorney, Agent, or Firm* — Shimokaji & Associates P.C.

(57) ABSTRACT

The present invention provides a method for producing a silicone hydrogel having a high water content. The method comprises the following steps:
(a) polymerizing a monomer mixture to form the silicone hydrogel, wherein the monomer mixture comprises at least one silicon-containing monomer and at least one ionic monomer; and
(b) placing the silicone hydrogel in an alkaline solution for at least 20 minutes, wherein the alkaline solution has a pH not less than 7.5 and the ionic monomer is present in an amount not less than 0.7 wt % based on the total dry weight of the silicone hydrogel.

16 Claims, 3 Drawing Sheets

METHOD FOR ENHANCING WATER CONTENT OF SILICONE HYDROGEL CONTACT LENS

BACKGROUND OF THE INVENTION

1. Field of the Invention

The present invention relates to a method for preparing an ocular article, and more particularly to a method for producing a silicone hydrogel with high water content.

2. Description of the Prior Art

So far, the contact lens has a development history of almost one hundred years, and is one of the important medical devices generally used by common lens population. In 1950s, a Czechoslovak scientist prepared a hydrogel by using poly (hydroxyethyl methacrylate) (HEMA), and invented a flexible contact lens, and this material is still being used now. With the progress of science and technology, the material of the contact lens also evolves towards high oxygen permeability and high comfort.

The contact lens made from a silicone hydrogel has a development history of many years. In the past, the development goals of the products were mainly focused on the improvement of the properties of the silicone hydrogel such as oxygen permeability and water content. Presently, the oxygen permeability of the silicone hydrogel products available in the market is up to 100 barrers or higher. However, the water content of the silicone hydrogel cannot be effectively improved.

Generally speaking, the silicone hydrogel consists mainly of a reaction product of a silicon-containing monomer and the water contained therein. The proportion of the water in the silicone hydrogel is also referred to as the water content of the silicone hydrogel. As the silicon-containing monomer and the reaction product thereof are hydrophobic and have a poor wettability, the contact lens made from the silicone hydrogel will have a poor surface wettability and a low water content, resulting in that the eyes tend to be dry and feel uncomfortable in wearing, which is the problem eagerly to be resolved in the current industry of silicone hydrogel contact lens.

In view of the problem of enhancing the water content and surface wettability of the contact lens, there have been improvements made by using various physical and chemical methods disclosed in the prior art. For example, U.S. Pat. Nos. 4,158,089 and 6,242,508 disclose adding other hydrophilic monomers to the formulation for co-polymerization; U.S. Pat. Nos. 5,969,076 and 6,596,294 disclose synthesizing various hydrophilic silicon-containing molecules by chemical methods and added the molecules to the formulation to improve hydrophilicity and wettability; and U.S. Pat. No. 6,367,929 discloses adding a high-molecular-weight hydrophilic polymer (such as PVP) to the main components of a silicone hydrogel to enhance the wettability and hydrophilicity. However, in terms of the technology status, these methods are less significant in effects for improving the water content of the silicone hydrogel, and the water contents are all less than 50%.

Moreover, there are also many researches on improvement of the water content or surface wettability of the contact lens by using physical methods. For example. U.S. Pat. Nos. 6,867,245 and 5,274,008 disclose using a high polarity mold in the preparation of contact lenses; and U.S. Pat. No. 4,214,014 discloses treating the surface of contact lenses with a plasma. Although these physical treatments may successfully improve the surface wettability of the contact lens, they cannot effectively enhance the water content of the contact lens itself, so that only a short-term comfort effect instead of a long-term comfort feeling can be obtained when wearing the contact lens improved by these methods.

In terms of comfort, the eyes always tend to be dry and feel uncomfortable after long-term wearing of the contact lens, and the underlying reasons include the higher water loss rate of the contact lens, the lack of sufficient tears provided by lacrimal gland, or the gradual water dissipation after long-time exposure of the contact lens to the air. Due to the above reasons, the wearers of contact lenses are likely to encounter the problems associated with dry eyes and even poor eyesight.

To sum up, there is still a need for a technical solution in the industry, so as to enable the contact lens formed by polymerization and molding to have a high water content and high water retention.

SUMMARY OF THE INVENTION

The present invention provides a method for producing a silicone hydrogel having high water content comprising the following steps:

(a) polymerizing a monomer mixture to form the silicone hydrogel, wherein the monomer mixture comprises at least one silicon-containing monomer and at least one ionic monomer; and (b) placing the silicone hydrogel in an alkaline solution for at least 20 minutes, wherein the alkaline solution has a pH not less than 7.5 and the ionic monomer is present in an amount not less than 0.7 wt % based on the total dry weight of the silicone hydrogel.

Compared with the prior art, the silicone hydrogel prepared by the method of the present invention has a high water content, which can lower the water loss rate of the contact lens made from the silicone hydrogel and eliminate the drawback of poor surface wettability of the contact lens, thereby effectively solving the problems encountered in the prior art.

DETAILED DESCRIPTION OF THE INVENTION

In order to make the features and advantages of the present invention more comprehensible, the present invention is described in further detail below with reference to preferred embodiments and the accompanying drawings.

The present invention provides a method for producing a silicone hydrogel having high water content which comprises the following steps:

(a) polymerizing a monomer mixture to form the silicone hydrogel, wherein the monomer mixture comprises at least one silicon-containing monomer and at least one ionic monomer; and (b) placing the silicone hydrogel in an alkaline solution for at least 20 minutes, wherein the alkaline solution has a pH not less than 7.5 and the ionic monomer is present in an amount not less than 0.7 wt % based on the total dry weight of the silicone hydrogel.

Herein, term "monomer" includes polymerizable low-molecular-weight compounds (that is, compounds generally having a number average molecular weight lower than 700) and polymerizable moderate- to high-molecular-weight compounds or polymers, which are also referred to as macro-monomers (that is, compounds generally having a number average molecular weight higher than 700). Therefore, it should be understood that the terms "silicon-containing monomer" and "ionic monomer" herein include monomers, macro-monomers, and prepolymers. The prepolymers are partially polymerized monomers or monomers that can be further polymerized.

The silicone hydrogel is generally prepared by polymerizing a monomer mixture containing at least one silicon-containing monomer. "Silicone" or "polysiloxane" refers to an organic polymer material containing at least 5 wt % of a silicon-oxygen chain (—OSi—), preferably 10 to 100 wt % of a silicon-oxygen chain, and more preferably 30 to 90 wt % of a silicon-oxygen chain.

In step (a) of the method according to the present invention, the ionic monomer used has a dissociable functional group such as carboxyl group. The effect of environmental pH on the dissociation of the group is shown in the following:

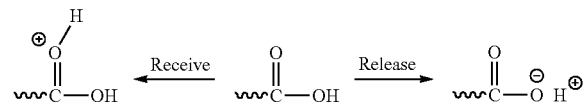

Figure 1:
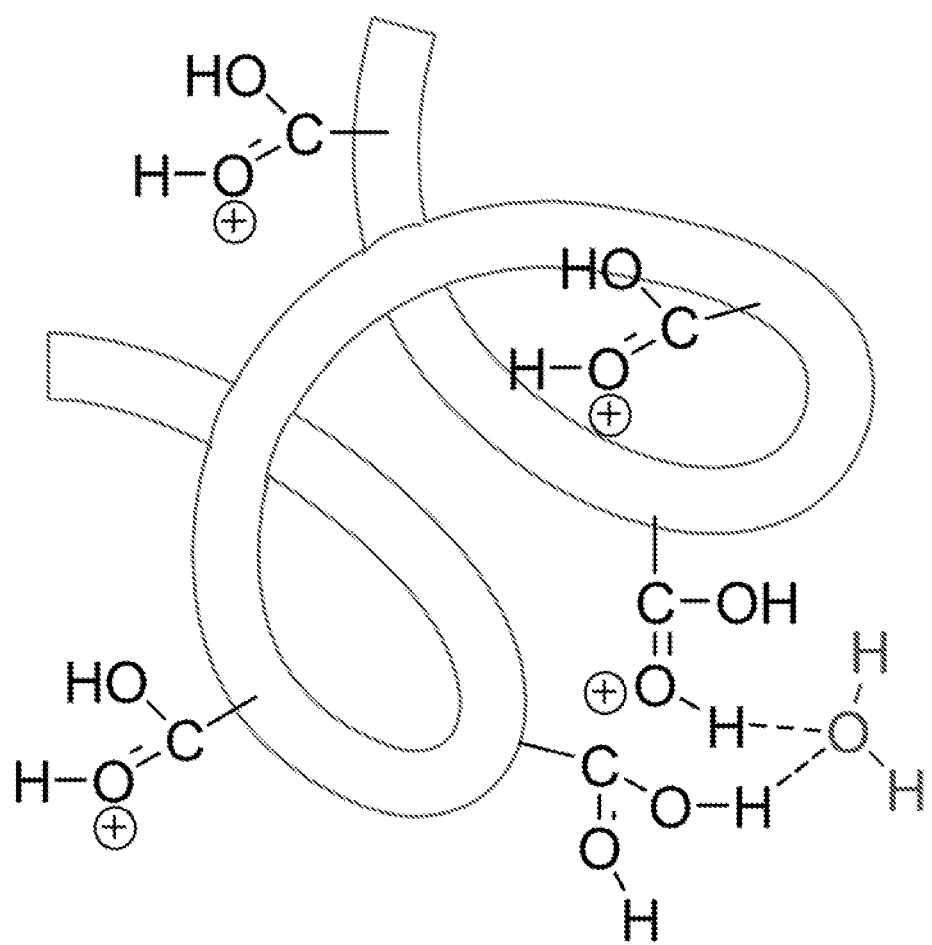
FIG. 1 illustrates that a carboxyl group cannot be self-dissociated in an acidic solution, but is easily protonated by a hydrogen ion in the solution to form a hydrogen bond, so that the network of the hydrogel is restricted, thereby decreasing the opportunities for water molecules to enter the hydrogel.

The effect is further described with reference to the drawings. As shown in FIG. 1, in an acidic solution with a pH lower than 7, the carboxyl group cannot be self-dissociated, and is easily protonated by a hydrogen ion in the solution to form a hydrogen bond, so that the network of the hydrogel is restricted, and the movement of the polymer chain in the hydrogel is also restricted, thus decreasing the opportunities for water molecules to enter the hydrogel, and reducing the swelling rate of the hydrogel.

Figure 2:
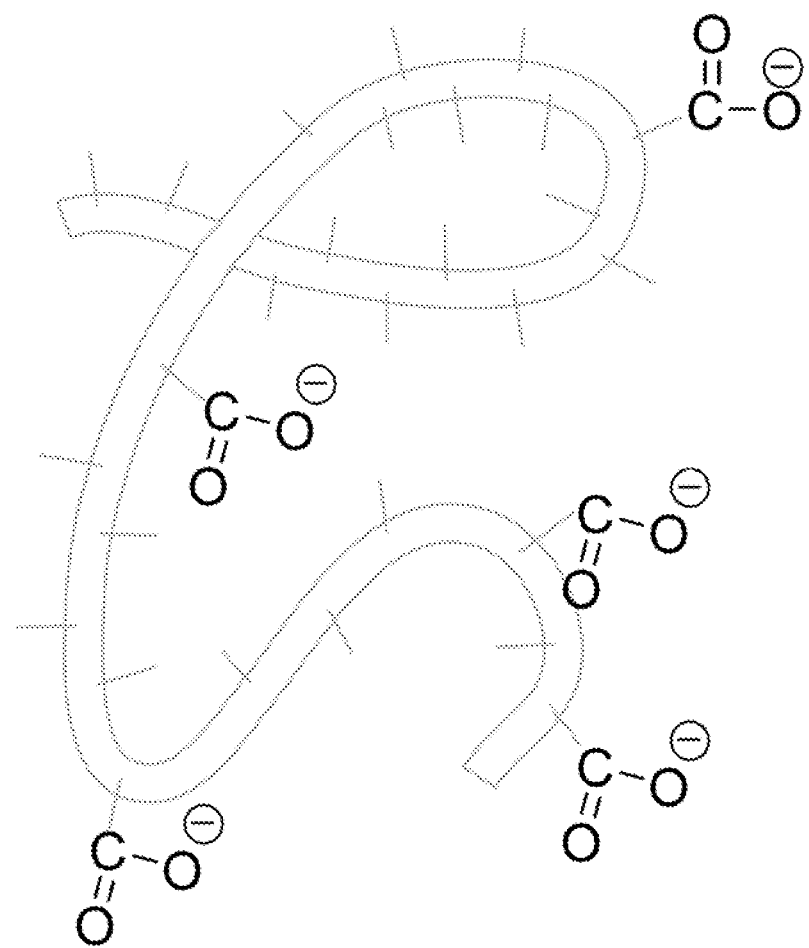
FIG. 2 illustrates that a carboxyl group can be dissociated in an alkaline solution and is present on polymer segments as an anion $COO^-$, which breaks the hydrogen bond, and thus anions are formed and a repulsive force is generated, resulting in a long distance between the segments, so that more water molecules enter the hydrogel.

As shown in FIG. 2, in an alkaline solution with a pH higher than 7, the carboxyl group can be dissociated and is present on polymer segments as an anion $COO^-$, which breaks the hydrogen bond, and a repulsive force is generated between the polymer segments due to the formation of anions, resulting in a lone distance between the segments to allow more water molecules to enter the hydrogel due to the changes in space, thereby enhancing the water content of the hydrogel.

The ionic monomer useful in the present invention includes, but is not limited to, acrylic acid, methacrylic acid (MA), fumaric acid, furan-2-acrylic acid, 3-(2-thienyl) acrylic acid, 6-methyl-2-(trimethylsilyl)-3-vinyl-6-heptenoic acid, 2-(trifluoromethyl)acrylic acid or a mixture thereof.

According to the present invention, the ionic monomer is present in an amount not less than 0.7 wt %, preferably 0.7 to 10 wt %, and more preferably 1 to 3 wt %, based on the total dry weight of the silicone hydrogel.

The silicon-containing monomer suitable for forming the silicone hydrogel of the present invention is not specifically limited, and any conventional silicon-containing monomer can be applied in the present invention, which includes, but is not limited to, (trimethylsiloxy)-3-methacryloxypropylsilane (TRIS), 3-(triethoxysilyl)propyl methacrylate, 3-diethoxymethylsilyl)-propyl methacrylate, vinyltrimethoxysilane, vinyltriethoxysilane, diethoxy(methyl)vinylsilane, 3-methacryloxypropyl-methyldimethoxysilane, 3-methacryloxypropyl-methyldiethoxysilane, 3-methacryloxypropyl-trimethoxysilane, 3-methacryloxypropyl-triethoxysilane, vinyltri(isopropoxy)silane, vinyltripropoxysilane, tris(trimethylsiloxy)silylpropyl methacrylate, bis(trimethylsiloxy)methylsilylpropyl methacrylate, pentamethyldisiloxanepropyl methacrylate, tris(trimethylsiloxy)silyl propyloxyethyl methacrylate, or tris(polydimethylsiloxy)silylpropyl methacrylate or a mixture thereof.

According to the present invention, the amount of the silicon-containing monomer is at least 40 wt %, preferably 40 to 60 wt %, and more preferably 45 to 55 wt %, based on the total dry weight of the silicone hydrogel.

Step (b) of the present invention is to place the silicone hydrogel formed by polymerization in an alkaline solution for being treated, where the alkaline solution has a pH value not less than 7.5, preferably from 7.5 to 11, and more preferably from 8 to 10, and the duration of the alkaline treatment is at least 20 min, and preferably 30 to 480 min.

The alkaline solution suitable for Step (b) of the present invention can be prepared from a base including, but not limited to, LiOH, NaOH, KOH, $Mg(OH)_2$, $Ca(OH)_2$, $NH_4OH$, $Na_2CO_3$, $K_2CO_3$, $MgCO_3$, $CaCO_2$, $(NH_4)_2CO_3$, $BaCO_3$, $NaHCO_3$, $KHCO_3$, CaO, BaO, $NaNH_2$, $KNH_2$, $Mg(NH_2)_2$, $Ca(NH_2)_2$, $Zn(NH_2)_2$, or $Al(NH_2)_3$ or an aqueous solution formulated with a combination of the above bases, of which an alkaline solution of NaOH or $NaHCO_3$ or a combination thereof is preferred.

The hydrated and cross-linked polymer system of the hydrogel contains water in an equilibrium state, the physical or chemical association between the water molecules and the polymer chain is very important, and the water molecules, depending on different behaviors and states, play different and critical roles (Synthesis and Characterization of a pH- and Ionic Strength-Responsive Hydrogel, Soft Materials, 5:4, 183-195; Journal of Applied Polymer Science, Vol. 101, 3227-3232 (2006)).

The water molecules in the hydrogel are mainly in two forms, that is, free water and bound water. The bound water may be further classified into freezing bound water and non-freezing bound water.

The free water refers to the water of which the water molecules can move freely in the network of the polymer chains without any attractive or repulsive force between the water molecules and the polymer chains in the entire network of the polymer chains. The non-freezing bound water refers to the water molecules that have a strong interaction force (hydrogen bond) with the functional groups on the polymer surface and are generally considered as a part of the polymer. This type of water molecules cannot move freely in the network of the polymer chains, so when the temperature reaches the freezing point of water, regular arrangement cannot be formed among the water molecules, and thus a crystalline state cannot be obtained. The interaction force of the water molecules of freezing bound water lies between those of the free water and the non-freezing bound water, and is only a slight force (Van der Waals force) with the water molecules bound to the polymer chain, so the crystallinity of the water molecules at the freezing point is weaker than that of normal water molecules.

When the polymer chain has many hydrophilic groups, hydration occurs between the hydrogel material and the water molecules, so that the amount of the freezing bound water and the non-freezing bound water is increased, which has a significant influence on the swelling performance and water content of the hydrogel. Generally, the water content of the hydrogel is greater than 5 wt %, and preferably in the range of 10 to 80 wt %. The amounts of different types of water molecules in the hydrogel can be determined by means of differential scanning calorimetry (DSC) and thermogravimetry (TG).

The amount of the non-freezing bound water contained in the silicone hydrogel prepared by the method of the present invention is at least 20%, preferably 20 to 40%, and more preferably 20 to 37%, based on the total amount of the free water, the freezing bound water and the non-freezing bound water. In this case, the silicone hydrogel has the capability of absorbing more water molecules. Due to the interaction force between the non-freezing bound water and the hydrogel material, the water loss rate is lowered; therefore, application of this property on the contact lens can lower the transpiration rate of water in the contact lens, so that a good wettability and comfort feeling can be kept during the wearing of the contact lens.

The water content of the silicone hydrogel prepared by the method of the present invention is at least 50%, preferably 50 to 70%, and more preferably 55 to 63%.

The monomer mixture contained in the silicon hydrogel prepared by the method of the present invention may optionally contain at least one hydrophilic non-ionic monomer, and the suitable hydrophilic non-ionic monomer includes, but is not limited to, 2-hydroxyethyl methacrylate (HEMA), 2-hydroxyethyl acrylate, glycerol methacrylate, 2-dimethylaminoethyl acrylate, N-vinyl-formamide, N-vinyl pyrrolidone (NVP), acryloylmorpholine, methacrylamide, N,N-dimethylacrylamide (DMA), N,N-diethylacrylamide, 2-hydroxyethyl methacrylamide, or N-isopropylacrylamide or a mixture thereof.

The amount of the hydrophilic non-ionic monomer is not more than 60 wt %, preferably 30 to 60 wt %, more preferably 35 to 55 wt %, and most preferably 40 to 50 wt %, based on the total dry weight of the silicone hydrogel.

In the co-polymerization of the silicone hydrogel of the present invention, a suitable polymerization initiator may be added, and the silicone hydrogel may be hardened through UV, heat or a combination thereof, so as to be cast. Representative thermal initiators include organic peroxides, for example, acetyl peroxide, lauroyl peroxide, decanoyl peroxide, stearoyl peroxide, benzoyl peroxide, t-butyl pivalate peroxide, dicarbonate peroxide, and a commercially available thermal initiator such as LUPERSOL® 256,225 (Atofina Chemical, Philadelphia, Pa.), and the like. The initiator is used at a concentration of about 0.01 to 2 wt % based on the total weight of the monomer mixture. Representative UV initiators are those known in the art, which can be for example, but are not limited to, diphenyl ethanedione methyl ether, diphenyl ethanedione ethyl ether, DAROCUR® 1173, 1164, 2273, 1116, 2959, 3331, IGRACURE® 651, and 184 (Ciba Specialty Chemicals, Ardsley, N.Y.).

As known by persons of ordinary skill in the art, in addition to the polymerization initiator, the silicone hydrogel of the present invention may optionally include other components, for example, an additional colorant, a UV absorbent, and an additional processing auxiliary such as those known in the field of contact lens.

The silicone hydrogel prepared by the method of the present invention has as good oxygen permeability, high water content and high water retention, and is suitable for preparing an ocular article, especially a contact lens or an intraocular lens (IOL). The surface contact angle of the article made from the silicone hydrogel of the present invention is not larger than 30°, preferably is 10° to 30°, and more preferably is 15° to 25° as measured by a surface contact angle meter.

A contact lens may be formed from the copolymer of the silicon hydrogel of the present invention through a conventional method, for example, the spin cast molding process disclosed in U.S. Pat. Nos. 3,408,429 and 3,496,254, the casting molding process disclosed in U.S. Pat. No. 5,271,875, or the compression molding process disclosed in U.S. Pat. Nos. 4,084,459 and 4,197,266. The polymerization of the monomer mixture may be conducted in a spin mold or a fixed mold corresponding to a desired shape of the contact lens. If necessary, the contact lens thus obtained may be further mechanically finished. The polymerization may also be conducted in a suitable mold or container to obtain a lens material having a button shape, a disc shape, or a rod shape, which may be further processed (for example, by machining, laser cutting or polishing) to obtain a contact lens having a desired shape.

The present invention is further described through the following examples; however the present invention is not limited thereto. Any modification or improvement easily made by persons of ordinary skill in the art falls in the disclosure of the specification and the scope of the attached claims.

EXAMPLES

Synthetic Chemicals 1. 2-Hydroxyethyl methacrylate (HEMA):

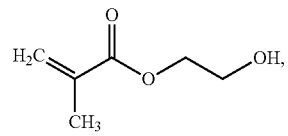

available from Sigma.

2. N-vinyl pyrrolidone (NVP):

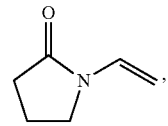

available from Sigma.

3. Methacrylic acid (MA):

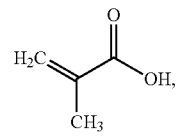

available from Sigma.

4. (Trimethylsilyloxy)-3-methylpropenyloxypropylsilane (TRIS):

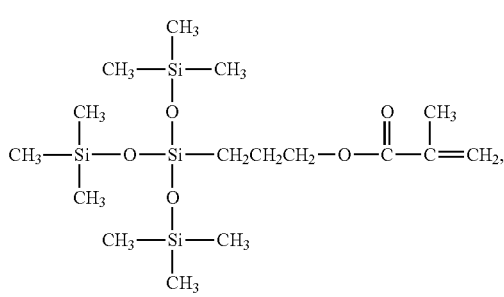

available from Sigma.

5. CoatOsil:

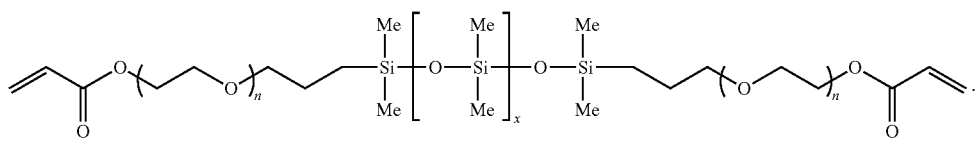

available from Momentive.

6. Ethylene glycol dimethyl acrylate (EGDMA):

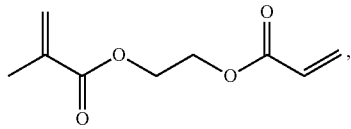

available from Sigma.

7. D1173 photo initiator: available from Ciba Chemicals.

Preparation of Silicone Hydrogel Material

Example 1

According to the composition and content shown as Formulation 1 in Table 1, the components were mixed uniformly, and cross-linked and polymerized for 60 min through UV irradiation, and then the resulting polymer was immersed in 50% alcohol for 20 min, and extracted with 70% alcohol for 60 min to remove the unreacted monomers. The prepared silicone hydrogel film was immersed in a sodium hydrogencarbonate (NaHCO₃) solution at pH 8 for 60 min, and then immersed in a saline for 60 min for exchanging. Finally, the obtained film was immersed in a saline for 120 min till water content equilibrium was reached.

Example 2

The feed ratio and reaction conditions were the same as those in Example 1, except that the prepared silicone hydrogel film was immersed in a sodium hydroxide (NaOH) solution at pH 9 for 60 min, and then immersed in a saline for 60 min for exchanging. Finally, the obtained film was immersed in a saline for 120 min till, water content equilibrium was reached.

Example 3

The feed ratio and reaction conditions were the same as those in Example 1, except that the prepared silicone hydrogel film was immersed in a sodium hydroxide (NaOH) solution at pH 10 for 60 min, and then immersed in a saline for 60 min for exchanging. Finally, the obtained film was immersed in a saline for 120 min till water content equilibrium was reached.

Comparative Example 1

The feed ratio and reaction conditions were the same as those in Example 1, except that the prepared silicone hydrogel film was directly immersed in a saline without being immersed in an alkaline solution.

Comparative Example 2

The feed ratio and reaction conditions were the same as those in Example 1, except that the prepared silicone hydrogel film was directly immersed in a sodium hydrogencarbonate (NaHCO₃) solution at pH 8 for 15 min, and then immersed in a saline for 60 min for exchanging. Finally, the obtained film was immersed in a saline for 120 min till water content equilibrium was reached.

Example 4

The feed ratio and reaction conditions were the same as those in Example 1, except that the prepared silicone hydrogel film was immersed in a sodium hydrogencarbonate (NaHCO₃) solution at pH 8 for 30 min, and then immersed in a saline for 60 min for exchanging. Finally, the obtained film was immersed in a saline for 120 min till water content equilibrium was reached.

Example 5

The feed ratio and reaction conditions were the same as those in Example 1, except that the prepared silicone hydrogel film was immersed in a sodium hydrogencarbonate (NaHCO₃) solution at pH 8 for 120 min, and then immersed in a saline for 60 min for exchanging. Finally, the obtained film was immersed in a saline for 120 min till water content equilibrium was reached.

Example 6

The feed ratio and reaction conditions were the same as those in Example 1, except that the prepared silicone hydrogel film was immersed in a sodium hydrogencarbonate (NaHCO₃) solution at pH 8 for 240 min. and then immersed in a saline for 60 min for exchanging. Finally, the obtained film was immersed in a saline for 120 min till water content equilibrium was reached.

Example 7

The feed ratio and reaction conditions were the same as those in Example 1, except that the prepared silicone hydrogel film was immersed in a sodium hydrogencarbonate (NaHCO$_3$) solution at pH 8 for 480 min, and then immersed in a saline for 60 min for exchanging. Finally, the obtained film was immersed in a saline for 120 min till water content equilibrium was reached.

Example 8

According to the composition and content shown as Formulation 2 in Table 1, the components were mixed uniformly, and cross-linked and polymerized for 60 min through UV irradiation, and then the resulting polymer was immersed in 50% alcohol for 20 min, and extracted with 70% alcohol for 60 min to remove the unreacted monomers. The prepared silicone hydrogel film was immersed in a sodium hydrogencarbonate (NaHCO$_3$) solution at pH 8 for 60 min, and then immersed in a saline for 60 min for exchanging. Finally, the obtained film was immersed in a saline for 120 min till water content equilibrium was reached.

Comparative Example 3

According to the composition and content shown as Formulation 3 in Table 1, the components were mixed uniformly, and cross-linked and polymerized for 60 min through UV irradiation, and then the resulting polymer was immersed in 50% alcohol for 20 min. and extracted with 70% alcohol for 60 min to remove the unreacted monomers. The prepared silicone hydrogel film was immersed in a sodium hydrogencarbonate (NaHCO$_3$) solution at pH 8 for 60 min, and then immersed in a saline for 60 min for exchanging. Finally, the obtained film was immersed in a saline for 120 min till water content equilibrium was reached.

TABLE 1

| Components | | Formulation 1 | Formulation 2 | Formulation 3 |
|---|---|---|---|---|
| Hydrophilic Non-ionic Monomer | HEMA (g) | 0.94 | 0.94 | 0.94 |
|  | NVP (g) | 2.44 | 2.44 | 2.44 |
| Ionic Monomer | MA (g) | 0.08 | 0.22 | 0.036 |
|  | amount (%) | 1.0 | 3.0 | 0.5 |
| Silicon-containing Monomer | TRIS (g) | 2.53 | 2.53 | 2.53 |
|  | CoatOsil (g) | 1.13 | 1.13 | 1.13 |
| Crosslinker | EGDMA (g) | 0.01 | 0.01 | 0.01 |
| Solvent | Hexanol (g) | 2.00 | 2.00 | 2.00 |
| Initiator | D1173 (mg) | 53.48 | 53.48 | 53.48 |

Water Content Test

The silicone hydrogel films formed by cross-linking through UV irradiation of the materials of Examples 1 to 8 and Comparative Examples 1 to 3 were removed from water, wiped off the water on the surface, and weighed to obtain a wet weight $W_0$. At the room temperature of 25° C., the film was stood and weighed at 5 min and 10 min respectively, to obtain weights $W_1$ and $W_2$. Then, the film was placed in an oven, dried for 24 hrs at 110° C. to remove water in the material, and weighed to obtain a dry weight $W_3$. The water loss rate and water content were calculated through equations below, and the results were shown in Table 2.

$$\text{Water loss rate (at 5 min)\%} = \frac{W_0 - W_1}{W_0} \times 100\%,$$

$$\text{Water loss rate (at 10 min)\%} = \frac{W_0 - W_2}{W_0} \times 100\%,$$

$$\text{Water content (overall)\%} = \frac{W_0 - W_3}{W_0} \times 100\%.$$

TABLE 2

| | Water Content % (overall) | Water Loss Rate (%) 5 min | Water Loss Rate (%) 10 min |
|---|---|---|---|
| Example 1 (pH 8) | 56.32 | 11.09 | 21.80 |
| Example 2 (pH 9) | 58.33 | 10.63 | 19.92 |
| Example 3 (pH 10) | 63.12 | 10.24 | 19.65 |
| Comparative Example 1 (pH 7) | 47.94 | 13.60 | 25.69 |
| Comparative Example 2 (pH 8) | 49.25 | 13.43 | 24.41 |
| Example 4 (pH 8) | 56.50 | 12.14 | 23.40 |
| Example 5 (pH 8) | 55.90 | 12.52 | 23.69 |
| Example 6 (pH 8) | 56.16 | 12.33 | 23.09 |
| Example 7 (pH 8) | 55.49 | 13.09 | 23.47 |
| Example 8 (pH 8) | 59.89 | 10.57 | 16.22 |
| Comparative Example 3 (pH 8) | 47.21 | 15.43 | 28.41 |

In Table 2, Examples 1 to 3 and Comparative Example 1 show the various properties obtained by immersing the prepared silicone hydrogel films in solutions at different pH values, and it can be seen that when a silicone hydrogel film was immersed in an alkaline solution with pH value of 8 or higher, the water content of the silicone hydrogel film is significantly increased and the water loss rate is reduced. Example 1 and 4 to 7 and Comparative Examples 1 and 2 show the various properties obtained by treating the prepared silicone hydrogel films with an alkaline solution for different periods of time, and it can be seen that only if the silicone hydrogel film is immersed in an alkaline solution for at least 30 min, the obtained film can have a high water content and low water loss. Examples 1 and 8 and Comparative Example 3 show the various properties of the silicone hydrogel films prepared with different contents of ionic monomer and it can be seen that when the amount of the ionic monomer in the silicone hydrogel film is not less than 1.0 wt %, the obtained silicone hydrogel film can have a high water content and low water loss.

Figure 3:
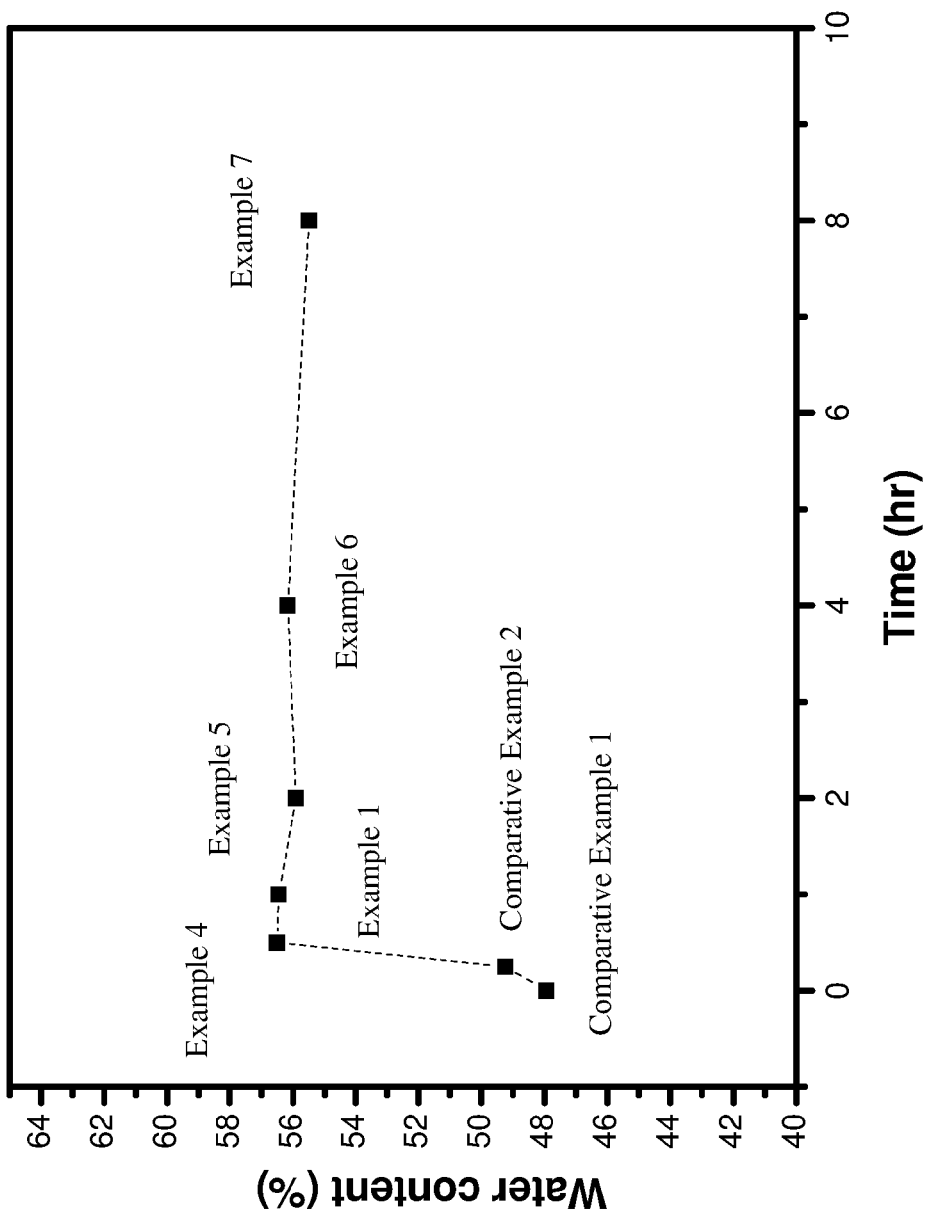
FIG. 3 shows the water content data for the silicone hydrogel films made according to Examples 1 and 4 to 7 and Comparative Examples 1 and 2.

It can be seen from the data in Table 2 and FIG. 3 that when silicone hydrogel is immersed in a sodium hydrogencarbonate (NaHCO$_3$) solution for about 30 min, the water content of the silicone hydrogel is increased by about 8% to 10%, and thus the silicone hydrogel can have a water content of 50% or higher, and the water loss rate of the silicone hydrogel is lowered, thereby achieving a water retention effect.

Surface Contact Angle Test

The surface contact angles of the silicon hydrogel films of Examples 1 to 3 and 8 and Comparative Examples 1 and 2 were measured with a contact angle meter. When a liquid was dropped on a surface of a solid, the angle between the surface of the solid and the tangent of the droplet is called "contact angle." When the contact angle is 0 degree, it is indicated that the liquid can fully wet the solid surface; and when the contact angle is 180 degrees, it is indicated that the liquid cannot wet the solid surface at all. The resultant data of the contact angle test is shown in Table 3 below.

TABLE 3

| | Surface Contact Angle |
|---|---|
| Example 1 (pH 8) | 18.80 ± 4.22 |
| Example 2 (pH 9) | 18.77 ± 6.97 |
| Example 3 (pH 10) | 18.10 ± 4.62 |

TABLE 3-continued

|  | Surface Contact Angle |
|---|---|
| Example 8 (pH 8) | 18.30 ± 4.65 |
| Comparative Example 1 (pH 7) | 51.14 ± 5.48 |
| Comparative Example 3 (pH 8) | 58.20 ± 5.25 |

As the ionic monomer in the silicone hydrogel treated with an alkaline solution is highly dissociated and more water molecules can be absorbed, the surface hydrophilicity of the silicone hydrogel is improved, and a good wettability can be achieved, so that the value of the surface contact angle is decreased significantly.

It should be understood that various modifications of the present invention are feasible, and are easy to be deduced and contemplated by those skilled in the art.

What is claimed is:

1. A method for producing a silicone hydrogel having a high water content comprising the following steps:
   (a) polymerizing a monomer mixture to form the silicone hydrogel, wherein the monomer mixture comprises at least one silicon-containing monomer, a hydrophilic non-ionic monomer, and at least one ionic monomer; and
   (b) placing the silicone hydrogel in an alkaline solution for at least 20 minutes,
   wherein the alkaline solution has a pH not less than 7.5 and the ionic monomer is present in an amount not less than 0.7 wt % based on the total dry weight of the silicone hydrogel, the silicon-containing monomer is present in an amount of at least 40 wt % based on the total dry weight of the silicone hydrogel, and the hydrophilic non-ionic monomer is used in an amount not more than 60 wt % based on the total dry weight of the silicone hydrogel.

2. The method according to claim 1, wherein the pH of the alkaline solution is in a range of 7.5 to 11.

3. The method according to claim 2, wherein the pH of the alkaline solution is in a range of 8 to 10.

4. The method according to claim 1, wherein the alkaline solution is prepared from a base selected from the group consisting of LiOH, NaOH, KOH, $Mg(OH)_2$, $Ca(OH)_2$, $NH_4OH$, $Na_2CO_3$, $K_2CO_3$, $MgCO_3$, $CaCO_2$, $(NH_4)_2CO_3$, $BaCO_3$, $NaHCO_3$, $KHCO_3$, CaO, BaO, $NaNH_2$, $KNH_2$, $Mg(NH_2)_2$, $Ca(NH_2)_2$, $Zn(NH_2)_2$, and $Al(NH_2)_3$, and a combination thereof.

5. The method according to claim 4, wherein the alkaline solution is NaOH or $NaHCO_3$ solution.

6. The method according to claim 1, wherein the silicone hydrogel is placed in the alkaline solution for 30 to 480 minutes.

7. The method according to claim 1, wherein the water content of the silicone hydrogel is not less than 50%.

8. The method according to claim 1, wherein the ionic monomer is present in an amount of 0.7 to 10 wt % based on the total dry weight of the silicone hydrogel.

9. The method according to claim 8, wherein the ionic monomer is present in an amount of 1 to 3 wt % based on the total dry weight of the silicone hydrogel.

10. The method according to claim 1, wherein the silicon-containing monomer is present in an amount of 40 to 60 wt % based on the total dry weight of the silicone hydrogel.

11. The method according to claim 10, wherein the silicon-containing monomer is present in an amount of 45 to 55 wt % based on the total dry weight of the silicone hydrogel.

12. The method according to claim 1, wherein the ionic monomer is selected from the group consisting of acrylic acid, methacrylic acid (MA), fumaric acid, furan-2-acrylic acid, 3-(2-thienyl)acrylic acid, 6-methyl-2-(trimethylsilyl)-3-vinyl-6-heptenoic acid, 2-(trifluoromethyl)acrylic acid, and a mixture thereof.

13. The method according to claim 1, wherein the silicon-containing monomer is selected from the group consisting of (trimethylsiloxy)-3-methacryloxypropylsilane (TRIS), 3-(triethoxysilyl)propyl methacrylate, 3-diethoxymethylsilyl)-propyl methacrylate, vinyltrimethoxysilane, vinyltriethoxysilane, diethoxy(methyl)vinylsilane, 3-methacryloxypropyl-methyldimethoxysilane, 3-methacryloxypropyl-methyldiethoxysilane, 3-methacryloxypropyl-trimethoxysilane, 3-methacryloxypropyl-triethoxysilane, vinyltri(isopropoxy)silane, vinyltripropoxysilane, tris(trimethylsiloxy)silylpropyl methacrylate, bis(trimethylsiloxy)methylsilylpropyl methacrylate, pentamethyldisiloxanepropyl methacrylate, tris(trimethylsiloxy)silylpropyloxyethyl methacrylate, tris(polydimethylsiloxy)silylpropyl methacrylate, and a mixture thereof.

14. The method according to claim 1, wherein the hydrophilic non-ionic monomer is used in an amount of 30 to 60 wt % based on the total dry weight of the silicone hydrogel.

15. The method according to claim 14, wherein the hydrophilic non-ionic monomer is used in an amount of 35 to 55 wt % based on the total dry weight of the silicone hydrogel.

16. The method according to claim 15, wherein the hydrophilic non-ionic monomer is used in an amount of 40 to 50 wt % based on the total dry weight of the silicone hydrogel.

* * * * *